(12) United States Patent
Hardy et al.

(10) Patent No.: US 10,289,193 B2
(45) Date of Patent: May 14, 2019

(54) USE OF VIRTUAL-REALITY SYSTEMS TO PROVIDE AN IMMERSIVE ON-DEMAND CONTENT EXPERIENCE

(71) Applicant: DISH Technologies L.L.C., Englewood, CO (US)

(72) Inventors: Christofer Hardy, Cheyenne, WY (US); John Inama, Cheyenne, WY (US)

(73) Assignee: DISH Technologies L.L.C., Englewood, CO (US)

(*) Notice: Subject to any disclaimer, the term of this patent is extended or adjusted under 35 U.S.C. 154(b) by 44 days.

(21) Appl. No.: 15/599,346

(22) Filed: May 18, 2017

(65) Prior Publication Data

US 2018/0335832 A1 Nov. 22, 2018

(51) Int. Cl.
*G06F 3/01* (2006.01)
*G06T 19/00* (2011.01)
*G06F 3/16* (2006.01)

(52) U.S. Cl.
CPC .............. *G06F 3/011* (2013.01); *G06F 3/165* (2013.01); *G06T 19/006* (2013.01)

(58) Field of Classification Search
CPC ........ G06F 3/011; G06T 19/006; G06Q 50/22
See application file for complete search history.

(56) References Cited

U.S. PATENT DOCUMENTS

| | | | |
|---|---|---|---|
| 6,200,138 B1 | 3/2001 | Ando et al. | |
| 6,409,599 B1 | 6/2002 | Sprout et al. | |
| 6,795,972 B2 | 9/2004 | Rovira | |
| 8,130,219 B2 | 3/2012 | Fleury et al. | |
| 8,560,387 B2 | 10/2013 | Amidon et al. | |
| 8,848,024 B2 | 9/2014 | Greenfield | |

(Continued)

OTHER PUBLICATIONS

Sherr et al., "Virtual reality and the silver screen: A match made in heaven," retrieved from http://www.cnet.com/news/virtual-reality-and-the-silver-screen-a-match-made-in-heaven/ on Feb. 21, 2017, 5 pages.

(Continued)

*Primary Examiner* — Samantha (Yuehan) Wang
(74) *Attorney, Agent, or Firm* — Seed IP Law Group LLP

(57) ABSTRACT

Embodiments are directed toward providing an interactive atmosphere for sharing on-demand content among multiple users in a virtual-reality environment. Each user utilizes a content receiver or virtual-reality headset to receive on-demand content. Each respective content receiver collects virtual-reality information associated with the user of that respective content receiver. This virtual-reality information includes movement information that describes movement of the user and look information that identifies a virtual look of the user. Content receivers share this virtual-reality information with each other so that each content receiver can generate a virtual-reality environment specific for its respective user along with the shared on-demand content. As each user physically moves his or her body, each virtual-reality environment adjusts to accommodate for these movements throughout the virtual-reality environment. This virtual-reality environment allows users to consume the same on demand content together and to interact with each other and the content itself.

18 Claims, 9 Drawing Sheets

(56) References Cited

U.S. PATENT DOCUMENTS

| | | |
|---|---|---|
| 8,869,197 B2 | 10/2014 | Chang et al. |
| 9,396,588 B1 | 7/2016 | Li |
| 2008/0307473 A1 | 12/2008 | Allen |
| 2013/0083173 A1* | 4/2013 | Geisner .................. G06F 3/013 348/51 |
| 2016/0037236 A1 | 2/2016 | Newell et al. |
| 2018/0005429 A1* | 1/2018 | Osman ...................... G06T 7/70 |

OTHER PUBLICATIONS

Wikipedia, "Oculus Rift," retrieved from http://en.wikipedia.org/wiki/Oculus_Rift on Feb. 22, 2017, 16 pages.

* cited by examiner

USE OF VIRTUAL-REALITY SYSTEMS TO PROVIDE AN IMMERSIVE ON-DEMAND CONTENT EXPERIENCE

BACKGROUND

Technical Field

The present disclosure relates generally to video content distribution, and more particularly, but not exclusively, to presentation of shared on-demand content in a virtual-reality system.

Description of the Related Art

Virtual-reality headsets are becoming cheaper and more readily available to the everyday user, and they could soon be a common electronic device in many households. These headsets allow users to experience content in a way that the user feels like they are actually participating in the content. Such hands-on experiences have been utilized in video gaming, movie watching, personal interactions, and other interactive and immersive-type content. However, since only one person is typically wearing the headset at a given time, such experiences can be rather lonesome and secluded, which minimizes the joy of interacting with others while interacting with the content. It is with respect to these and other considerations that the embodiments herein have been made.

BRIEF SUMMARY

Briefly described, embodiments are directed toward systems and methods of providing an interactive atmosphere for sharing on-demand content among a plurality of users in a virtual-reality environment, and in particular to a virtual theater environment. Each of a plurality of users utilize a content receiver or virtual-reality headset, or a combination thereof, to receive on-demand content that is shared between the users. Each respective content receiver collects virtual-reality information associated with the user of that respective content receiver. This virtual-reality information includes movement information that describes the movement of the user and look information that identifies a virtual look of the user. The content receivers share this virtual-reality information with each other so that each content receiver can generate a virtual theater environment specific for its respective user. The virtual theater environment includes a plurality of seats, a virtual screen, and a stage from the perspective of the respective user. The shared on-demand content is displayed on the virtual screen and virtual renderings of the other users are displayed in the virtual theater environment based on the movement information of those particular users. As each user physically moves his or her body, each virtual theater environment adjusts to accommodate for these movements throughout the virtual theater environment. This virtual theater environment allows users to consume the same on demand content together and to interact with each other and the content itself.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1:
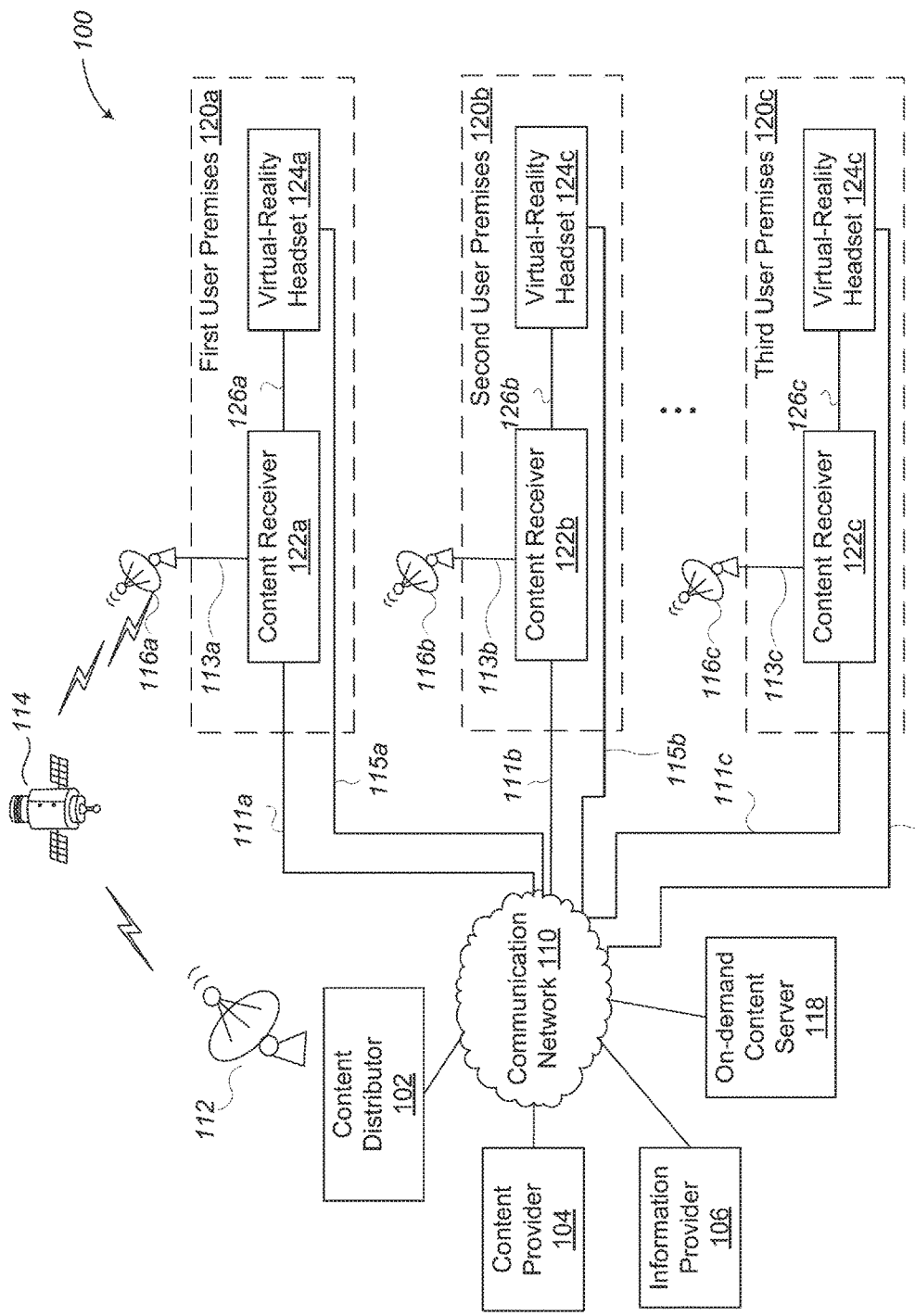
FIG. 1 illustrates a context diagram for providing audio-visual content to a user via a virtual-reality headset in accordance with embodiments described herein.

FIG. 1 illustrates a context diagram for providing audiovisual content to a user via a virtual-reality headset in accordance with embodiments described herein. Example 100 may include content provider 104, information provider 106, content distributor 102, communication networks 110, on-demand content server 118, and user premises 120a-120c.

Typically, content providers 104 generate, aggregate, and/or otherwise provide audiovisual content that is provided to one or more users. Sometimes, content providers are referred to as "channels." Examples of content providers 104 may include, but are not limited to, film studios, television studios, network broadcasting companies, independent content producers, such as AMC, HBO, Showtime, or the like, or other entities that provide content for user consumption. A content provider may also include individuals that capture personal or home videos, and distribute these videos to others over various online media-sharing websites or other distribution mechanisms. The content provided by content providers 104 may be referred to as the program content, which may include movies, sitcoms, reality shows, talk shows, game shows, documentaries, infomercials, news programs, sports broadcasts, or the like. In this context, program content may also include commercials or other television advertisements. It should be noted that the commercials may be added to the program content by the content providers 104 or the content distributor 102.

Information provider 106 may create and distribute data or other information that describes or supports audiovisual content. Generally, this data is related to the content provided by content provider 104. For example, this data may include, for example, metadata, program name, closed-caption authoring, and placement within the content, timeslot data, pay-per-view and related data, or other information that is associated with the content. In some embodiments, a content distributor 102 may combine or otherwise associate the data from information provider 106 and the content from content provider 104, which may be referred to as the distributed content. However, other entities may also combine or otherwise associate the content and other data together.

Content distributor 102 may provide the content, whether content obtained from content provider 104 and/or data from information provider 106, to a user through a variety of different distribution mechanisms. For example, in some embodiments, content distributor 102 may provide content and data to one or more users' content receivers 122a-122c through communication network 110 on communication links 111a-111c, respectively. In other embodiments, the content and data may be sent through uplink 112, which goes to satellite 114 and back to satellite antennas 116a-116c, and to the content receivers 122a-122c via communication links 113a-113c, respectively. It should be noted that some content receives may receive content via satellite 114, while other content receivers receive content via communication network 110.

On-demand content server 118 communicates with the content receivers 122a-122c or virtual-reality headsets 124a-124c of each respective user via communication network 110 to coordinate shared on-demand content among multiple users, as described herein. Briefly, the on-demand content server 118 receives virtual-reality information for each user and provides it to each other user along with the on-demand content so that the content receivers 122a-122c or virtual-reality headsets 124a-124c of each respective user can generate a respective virtual theater environment for the shared on-demand content. In various embodiments, the on-demand content server 118 or the functionality of the on-demand content server 118 is part of or otherwise incorporated into the content distributor 102 or the content provider 104, or it may be a separate device.

Communication network 110 may be configured to couple various computing devices to transmit content/data from one or more devices to one or more other devices. For example, communication network 110 may be the Internet, X.25 networks, or a series of smaller or private connected networks that carry the content and other data. Communication network 110 may include one or more wired or wireless networks.

Content receivers 122a-122c are receiving devices of content from content distributor 102 or on-demand content server 118, and they provide the content to virtual-reality headsets 124a-124c, respectively, for presentation to their respective user. Examples of content receivers 122a-122c include, but are not limited to, a set-top box, a cable connection box, a computer, or other content or television receivers. The content receivers 122a-122c can be configured to receive the content from the content distributor 102 or the on-demand content server 118 via communication network 110 and communication links 111a-111c, respectively, or via satellite antennas 116a-116c and communication links 113a-113c, respectively.

The following is a brief discussion of the functionality of content receiver 122a and virtual-reality headset 124a. It should be noted, that content receivers 122b-122c and virtual-reality headsets 124b-124c perform similar functionality.

Content receiver 122a is configured to provide content to a user's virtual-reality headset 124a, or to other display devices, such as a television, monitor, projector, etc. In various embodiments, content receiver 122a communicates with virtual-reality headset 124a via communication link 126a to provide on-demand content to a user, as described herein. Communication link 126a may be a wired connection or wireless connection, such as Bluetooth, Wi-Fi, or other wireless communication protocol.

In some embodiments, the content receiver 122a generates a virtual theater environment, as described herein, and provides it to the virtual-reality headset 124a to be displayed to a user. In other embodiments, the content receiver 122a provides on-demand content to the virtual-reality headset 124a, but does not generate the virtual theater environment. In yet other embodiments, the content receiver 122a receives the virtual theater environment from the on-demand content server 118 and provides it to the virtual-reality headset 124a for display to a user.

As described herein, virtual-reality information is shared among multiple users to generate a virtual theater environment for each user. In some embodiments, the content receiver 122a collects, obtains, generates, or otherwise determines the virtual-reality information for the user of the virtual-reality headset 124a from the virtual-reality headset 124a, or from one or more cameras or other sensors (not illustrated), or a combination thereof, as described in more detail herein. The content receiver 122a utilizes this virtual-reality information to generate the virtual theater environment, or it can provide it to the on-demand content server 118 or to the virtual-reality headset 124a to generate the virtual theater environment. In any event, the content receiver 122a provides the virtual-reality information to the on-demand content server 118 so that it can be shared with other content receivers 122b-122c or virtual-reality headsets 124b-124c to generate virtual-reality theater environments for each respective user, as described herein.

The virtual-reality headset 124a is configured to display a virtual theater environment to a user of the virtual-reality headset 124a. Virtual-reality headset 124a may be an all-in-one virtual-reality headset or it may be a combination of multiple separate electronic devices, such as a smartphone and a head-mounting apparatus.

In some embodiments, the virtual-reality headset 124a receives the virtual theater environment from the content receiver 122a via communication link 126a and displays it to a user. In other embodiments, the virtual-reality headset 124a receives on-demand content from the content receiver 122a and generates the virtual reality environment itself before displaying it to the user. In at least one such embodiment, the virtual-reality headset 124a obtains virtual-reality information associated with other users from the on-demand content server 118 via the content receiver 122a. In other embodiments, the virtual-reality headset 124a may communicate with content distributor 102 or on-demand content server 118 via communication network 110 and communication link 115a independent of and separate from content receiver 122a. For example, in some embodiments, the virtual-reality headset 124a obtains virtual-reality information associated with other users from the on-demand content server 118 via communication network 110 and communication link 115a. In yet other embodiments, the virtual-reality headset 124a provides the virtual-reality information of the user of the virtual-reality headset 124a to the on-demand content server 118 so that it can be shared with other content receivers 122b-122c or virtual-reality headsets 124b-124c, as described herein.

In various embodiments, content receiver 122a is separate from or independent of the virtual-reality headset 124a, such as is illustrated in FIG. 1. In various other embodiments, content receiver 122a may be part of or integrated with the virtual-reality headset 124a.

Although the forgoing description provides details of content receiver 122a and virtual-reality headset 124a, content receivers 122b-122c and virtual-reality headsets 124b-124c include similar functionality. For example, content receivers 122b-122c can receive content from content distributor 102 via satellite 114 via antenna 116b-116c and communication links 113b-113c, respectively, and communicate with content distributor 102 or on-demand content server 118 via communication network 110 and communication links 111b-111c, respectively. Similarly, virtual-reality headsets 124b-124c can communicate with content receivers 122b-122c via communication links 126b-126c, respectively, or communicate with on-demand content server 118 via communication network 110 and communication links 115b-115c, respectively.

Figure 2:
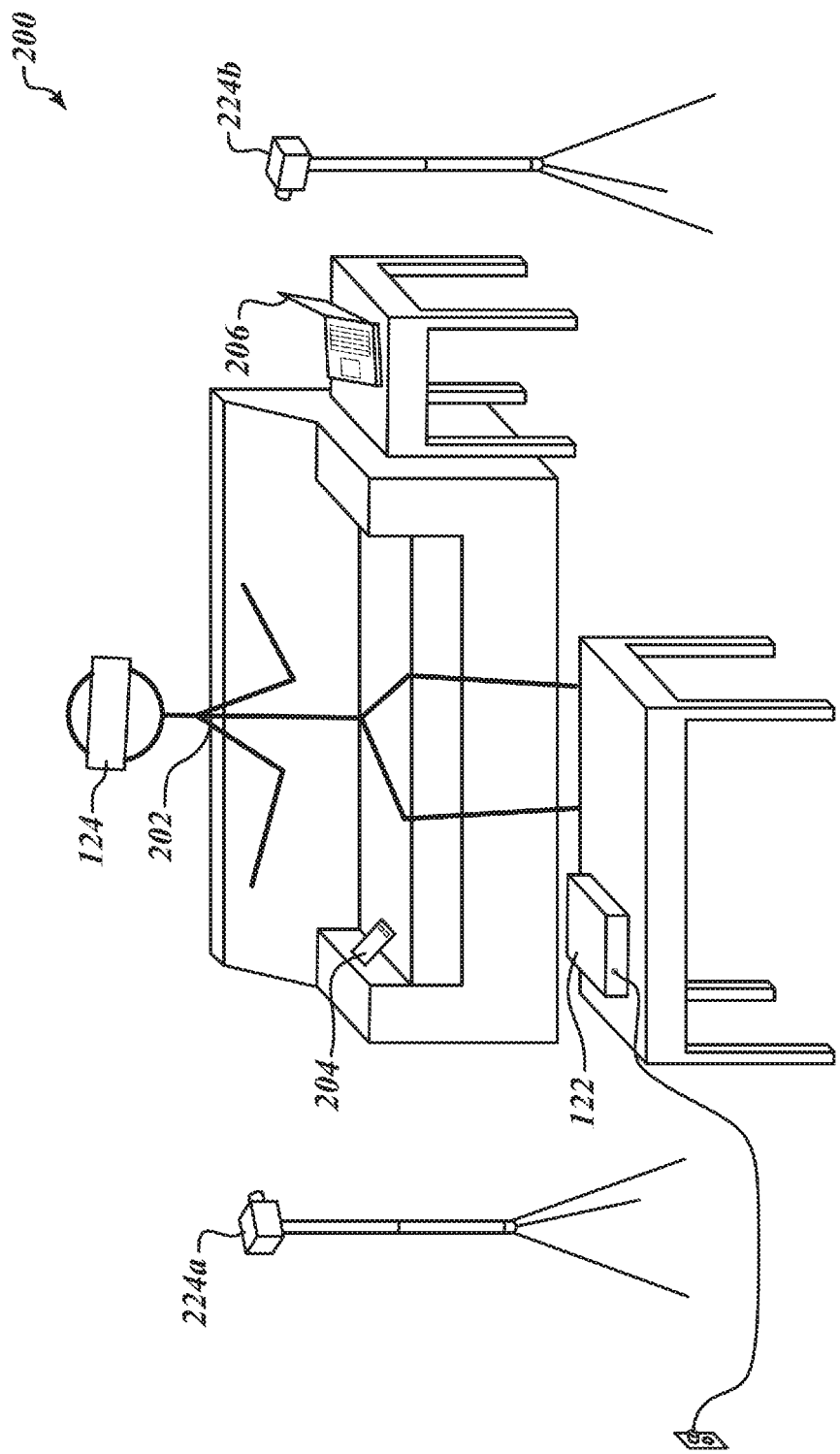
FIG. 2 illustrates an example environment of a user utilizing a virtual-reality headset in accordance with embodiments described herein.

FIG. 2 illustrates an example environment of a user utilizing a virtual-reality headset in accordance with embodiments described herein. Environment 200 is an example of a user premises, such as first user premises 120a in FIG. 1. Environment 200 includes user 202 sitting in front of a plurality of cameras 224a-224b. Each camera 224 captures images of the user 202, which are utilized to track the physical movement of the user 202 throughout the environment 200. Although FIG. 2 illustrates only two cameras 224a and 224b, more or less cameras may also be used. Similarly, cameras may be embedded in or part of other electronic devices, such as, but not limited to, smartphone 204, laptop 206, or content receiver 122. Each of these devices may also capture images of the user 202 for tracking movement of the user 202.

In some embodiments, camera 224a, or another camera, captures at least one image of user 202 prior to the user putting on the virtual-reality headset 124. Facial recognition techniques are utilized to digitize the user's face. This digitized rendering of the user's face is provided to other users as the virtual rendering of the user 202. In other embodiments, the user 202 may select an avatar, celebrity impression, or other character representation to use as the virtual rendering of the user, rather than the digitized version of his or her own face.

In various embodiments, each device that includes a camera communicates with content receiver 122 or virtual-reality headset 124 via a wired or wireless communication connection to provide captured images to the content receiver 122 or virtual-reality headset 124 for processing. In particular, image recognition techniques are utilized on the captured images to identify different body parts of the user 202, and differences from one image to the next indicate and characterize movement of those body parts. This movement information is utilized to subsequently adjust the perspective of a virtual theater environment presented to the user 202 and to move or animate the virtual rendering of the user 202 for other users.

Figure 3A:
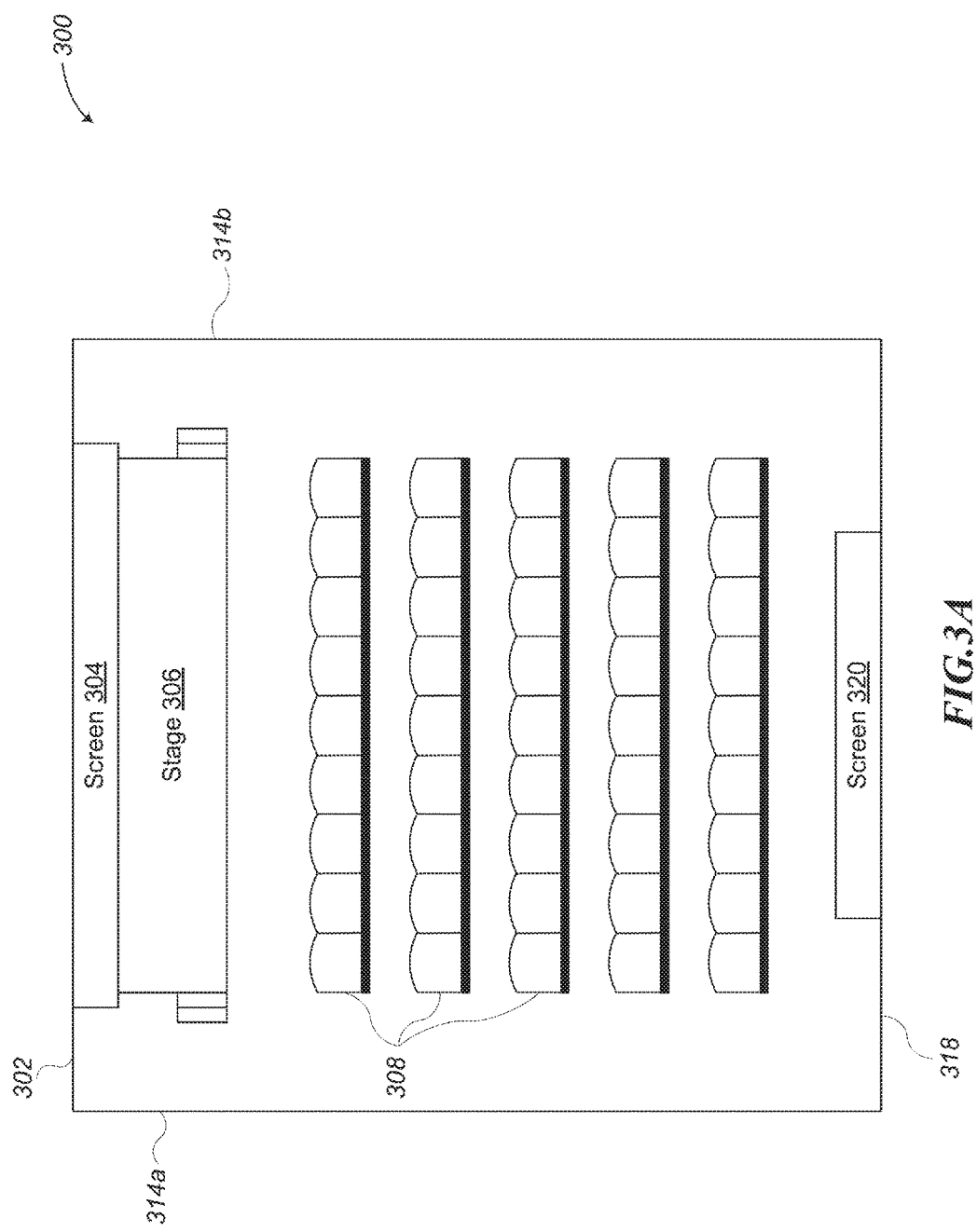
FIGS. 3A-3C show example virtual theater environments that are being presented to users in accordance with embodiments described herein.
Figure 3B:
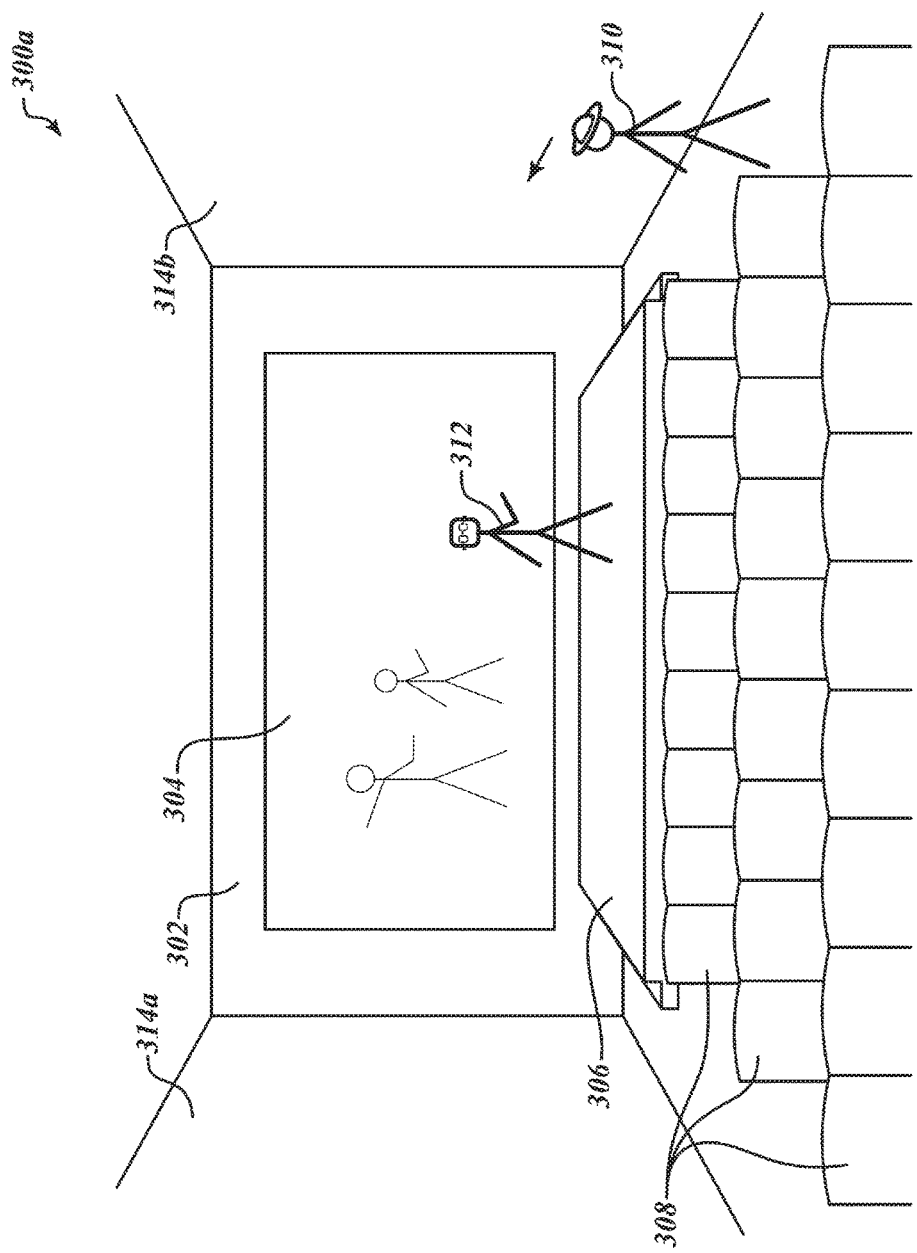
Figure 3C:
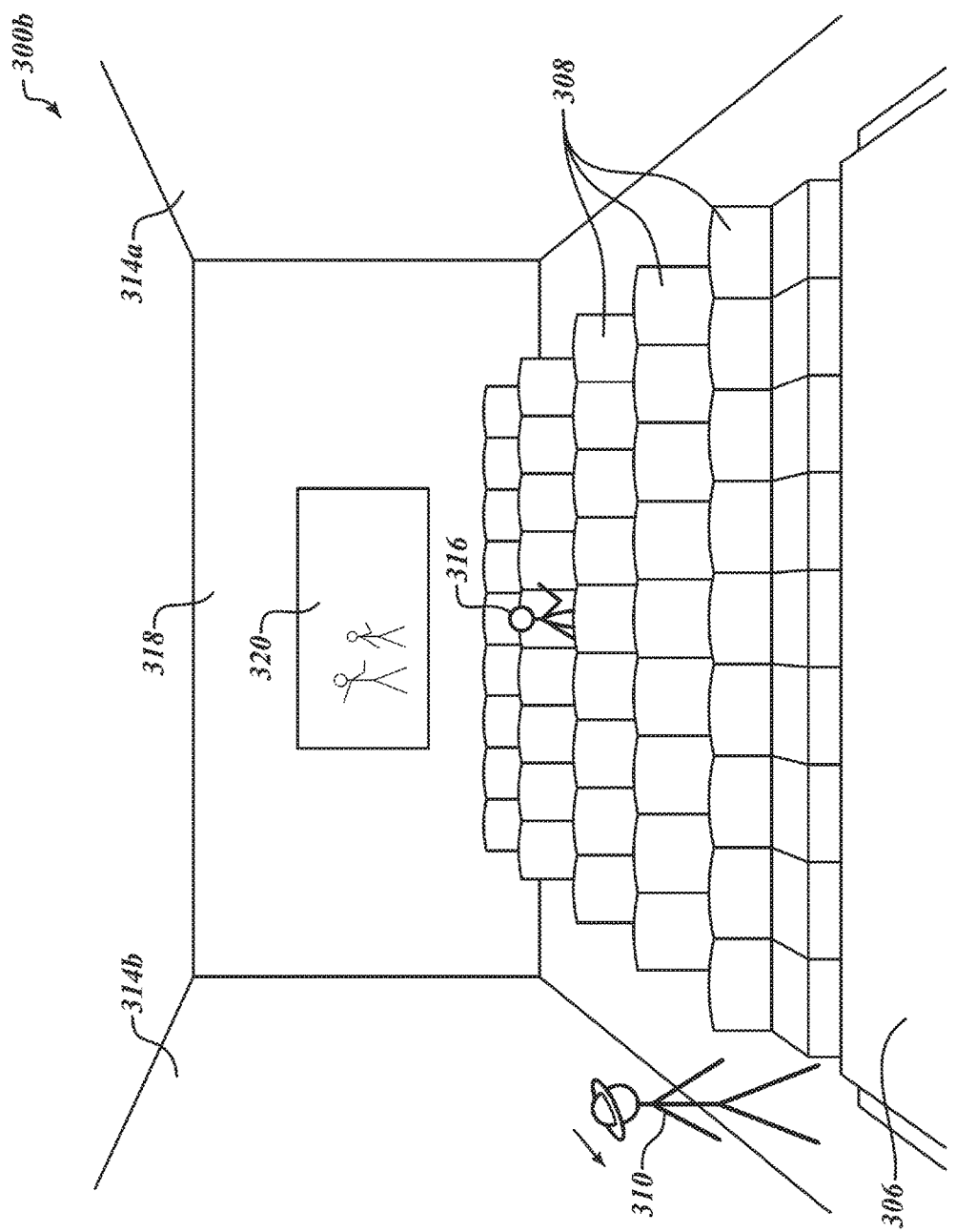

FIGS. 3A-3C show example virtual theater environments that are being presented to users in accordance with embodiments described herein. FIG. 3A shows a top-down view of a virtual theater environment 300. In the illustrated example, the virtual theater environment 300 includes front wall 302, side walls 314a and 314b, and back wall 318. On front wall 302 is a virtual screen 304 that displays on demand content to the user watching the virtual theater environment. The virtual theater environment 300 also includes a virtual stage 306 positioned in front of the front wall 302 and a plurality of virtual seats 308 positioned between the stage 306 and back wall 318. As described in more detail below, users can sit in the virtual seats 308 or move throughout the virtual theater environment 300 to watch the virtual screen 304. Similarly, users can interact with other users on the virtual stage 306 or other areas of the environment 300. In some embodiments, the virtual theater environment 300 includes a second virtual screen, such as screen 320 on back wall 318. In this way, users can still watch the on-demand content even if they are not facing the screen 304 on the front wall. It should be noted that the number and positions of the screens 304 and 320, seats 308, and stage 306 may be different from what is illustrated.

FIG. 3B shows virtual theater environment 300a. Virtual theater environment 300a is an embodiment of virtual theater environment 300 in FIG. 3A, but from the perspective of a first user, e.g., a user of virtual-reality headset 124a in first user premises 120a in FIG. 1, sitting in one of virtual seats 308. As described above, virtual theater environment 300a includes a front wall 302 and side walls 314a-314b.

On the front wall 302 is a virtual screen 304 that is displaying on-demand content that is shared between the first user and one or more other users. The virtual theater environment 300a also includes a virtual stage 306 that is positioned between the virtual screen 304 and the plurality of virtual seats 308.

Along with the on-demand content, the virtual theater environment 300a also includes a virtual rendering of other users that are participating in the shared on-demand content. In this illustration, character 310 is a virtual rendering of a second user and character 312 is a virtual rendering of a third user, where the second and third users are remote from the first user. For example, the second user may be a user of virtual-reality headset 124b in second user premises 120b in FIG. 1, and the third user may be a user of virtual-reality headset 124c in third user premises 120c in FIG. 1. As discussed elsewhere herein, a virtual theater environment is generated and presented to each user participating in the shared on-demand content but from their own perspective. For example, the virtual theater environment 300a is from the perspective of the first user and the virtual theater environment 300b in FIG. 3C is from the perspective of the third user.

As discussed elsewhere herein, the physical movement of a user is tracked and translated into changes in the virtual theater environment and to move or animate the virtual rendering of the user in the virtual theater environment of other users. As illustrated in FIG. 3B, character 310, i.e., the virtual rendering of the second user, is walking along the side wall 314b towards the stage 306. The movement of character 310 is created based on the physical movements of the second user, such as the second user physically walking in place. Character 312, i.e., the virtual rendering of the third user, is standing on the virtual stage 306 facing the virtual seats 308. Character 312 may have reached the stage in a manner similar to the second user and character 310. Once on the stage 306, the second and third users can begin to physically move, act, dance, or perform other physical movements that translate into characters 310 and 312 moving, acting, dance, etc. on the virtual stage 306. The virtual theater environment allows the first user to watch the characters 310 and 312 of the second and third users move or interact with the on-demand content being shown on the virtual screen 304.

FIG. 3C shows virtual theater environment 300b. Virtual theater environment 300b is an embodiment of virtual theater environment 300 in FIG. 3A, but from the perspective of the third user standing on the virtual stage 306, as mentioned above. As illustrated, the virtual theater environment 300b includes side walls 314a-314b, similar to the virtual theater environment 300a in FIG. 3B, and also a back wall 318.

As described herein, users can move throughout the virtual theater environment 300b. In this example illustration, the third user has moved onto the stage 306. While one the stage 306, the third user can be facing the screen 304 on the front wall 302 or some other direction. If the third user is facing the screen 304, then the third user can watch the on-demand content on the screen 304. But if the third user is not facing the screen 304, then the on-demand content can be displayed to the third user in another manner. For example, the on-demand content can be displayed on a second screen 320 that is on back wall 318, as illustrated in FIG. 3C. In this way, the third user can enjoy the on-demand content even though the third user is on the virtual stage 306 and not looking at screen 304.

In other embodiments, the user can select to have other content displayed on screen 320. For example, the user can select other content that is related or un-related to the on-demand content being shown on screen 304. As an illustrative example, the on-demand content being displayed on screen 304 may be a musical, and the content displayed on screen 320 may be the words, notes, or sheet music for the current song in the musical so that the user can sing along with the current song. In yet other embodiments, advertisements are displayed on the screen 320. In one such embodiment, the user can make an "in-app" purchase to remove the advertisements from the second screen 302, to display the on-demand content, or to display other content.

In some other embodiments, screen 320 or back wall 318 may display other scenery or graphics. For example, the screen 320 or back wall 318 may display an outside landscape or some other scenery other than the inside of the theater. In this way, virtual theater environment may simulate a theater without a back wall 318 or some other setting. As mentioned above, the character 310 of the second user is walking down to the virtual stage 306 along the side wall 314b. Also illustrated is character 316, which is a virtual rendering of the first user sitting in the virtual seats 308.

Although FIGS. 3B and 3C illustrate the virtual theater environments from the perspective of being through the eyes of the user, e.g., first person point of view, embodiments are not so limited. In other embodiments, the user or virtual rendering of the user may be displayed in in the virtual theater environment, e.g., third person point of view. In this way, the user can watch their own movements with respect to other users or the on-demand content. In various embodiments, the user can select between the first person and third person points of view.

By employing embodiments described herein, the users can move throughout the virtual theater environment, watch the virtual renderings of other users move throughout the virtual theater environment, and view the on-demand content that is shared between the users.

Although FIGS. 3A-3C show a virtual theater environment that simulates or resembles a movie theater, embodiments are not so limited, and the virtual theater environment may simulate or represent other types settings, landscapes, or environments.

Figure 3D:
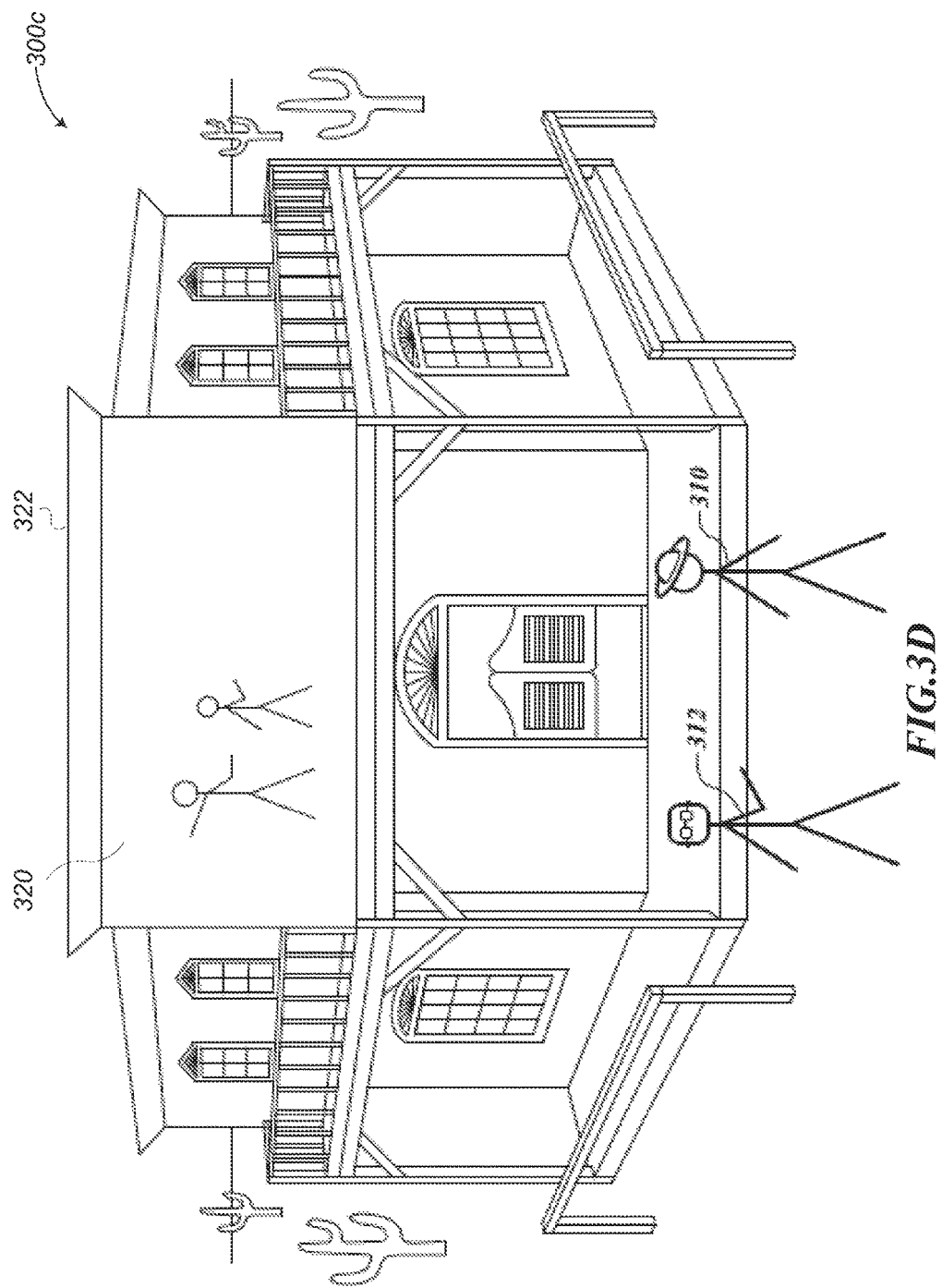
FIG. 3D shows an alternative example virtual theater environment that is being presented to users in accordance with embodiments described herein.

FIG. 3D shows an alternative example virtual theater environment that is being presented to users in accordance with embodiments described herein. As illustrated, virtual theater environment 300c shows a western-themed environment from the perspective of the first user of the first user premises 120a in FIG. 1. In this example, the virtual theater environment 300c includes a western-styled building. Similar to FIGS. 3B and 3C illustrated above, characters 310 and 312 representing the second and third users of the second and third user premises 120b-120c, respectively, are shown in the virtual theater environment 300c based on the users' particular virtual renderings and movements. Moreover, similar to what is described herein, the on-demand content is displayed on a screen 320 on the building 322. Accordingly, the virtual renderings of the various users can interact with one another and re-enact, sing along, or otherwise, interact with the on-demand content. The illustration in FIG. 3D is one example of an alternative virtual theater environment and other scenes or landscapes are also envisaged.

The operation of certain aspects will now be described with respect to FIGS. 4 and 5. In at least one of various embodiments, process 400 described in conjunction with FIG. 4 may be implemented by or executed on one or more computing devices, such as content distributor 102 or on-demand content server 118 in FIG. 1; and process 500 described in conjunction with FIG. 5 may be implemented by or executed on one or more computing devices, such as content receiver 122 or virtual-reality headset 124 in FIG. 1.

Figure 4:
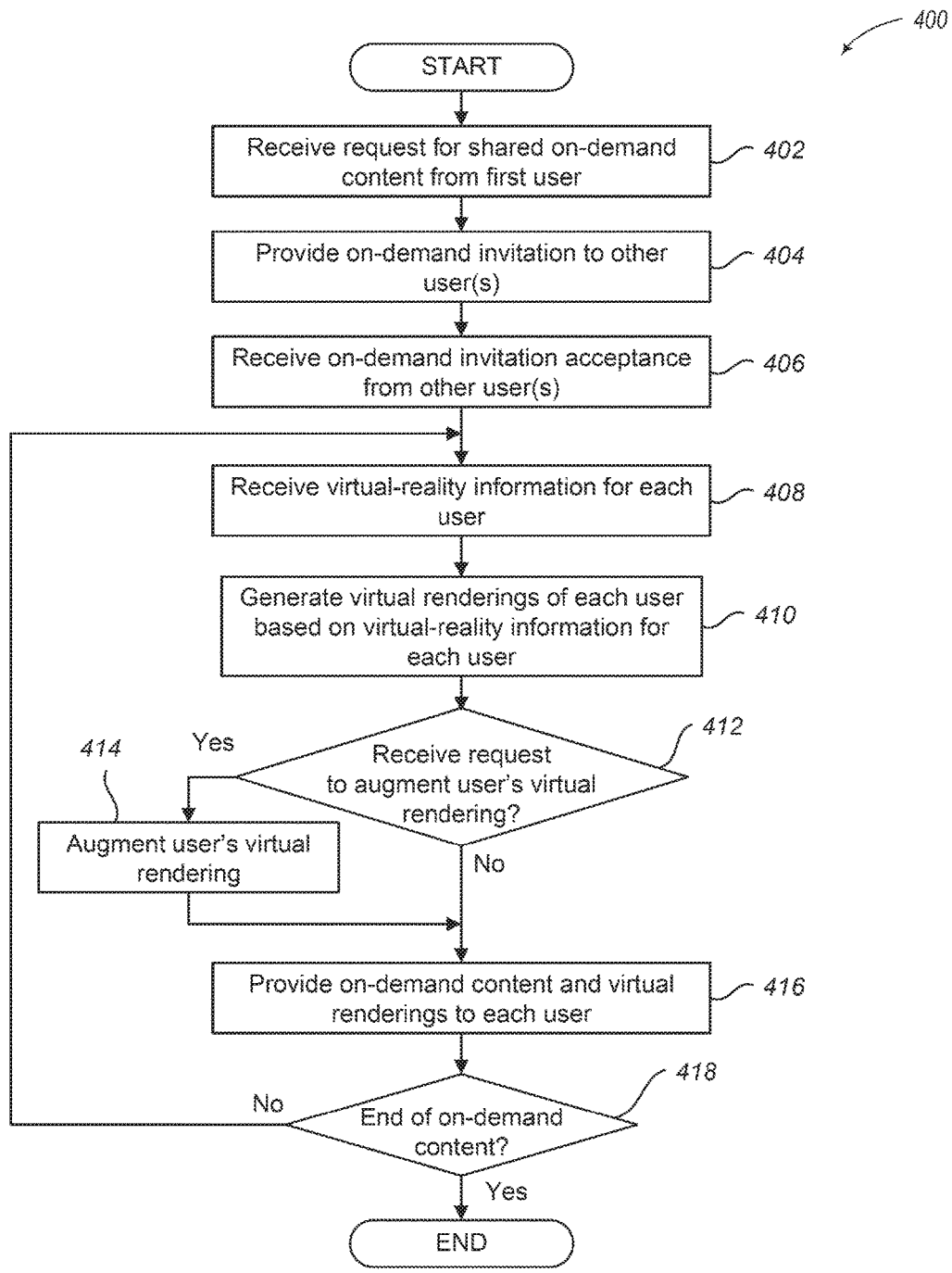
FIG. 4 illustrates a logical flow diagram generally showing one embodiment of a process performed by an on-demand content server to coordinate shared on-demand content for users in a virtual theater environment in accordance with embodiments described herein.

FIG. 4 illustrates a logical flow diagram generally showing one embodiment of a process performed by an on-demand content server to coordinate shared on-demand content for users in a virtual theater environment in accordance with embodiments described herein. Process 400 begins, after a start block, at block 402, where a request for shared on-demand content is received from a content receiver of a first user. In various embodiments, the first user may be presented with a list of on-demand content that can be shared among a plurality of users. From this list, the first user can select the on-demand content to share, and the content receiver of the first user sends the selection to the server.

In various embodiments, the request also includes a list of one or more other users with which the first user would like to share the on-demand content. These other users may be friends of the first user, where the first user selects which friends to invite to share the on-demand content, such as via a list of friends determined from a social network account of the first user.

Process 400 proceeds to block 404, where an on-demand invitation is provided to the other users selected by the first user. In some embodiments, the server sends an email to the other users from which they can select a link to accept the invitation. In other embodiments, the server provides the on-demand invitation to the other users via the content receivers associated with the other users. For example, the content receivers may display the invitation in a graphical user interface on a corresponding television from which the other users can accept or decline the on-demand invitation. The corresponding content receivers then send a message to the on-demand content server indicating the acceptance or non-acceptance of the on-demand invitation.

Process 400 continues at block 406, where the server receives an acceptance of the on-demand invitation from at least one of the other users. In some embodiments, each acceptance includes a unique identifier of the content receiver associated with the other user that accepted the invitation. This unique identifier is utilized by the server to encrypt or otherwise secure the on-demand content so that it is viewed by only those users for which it is intended, i.e., the user associated with the content receiver that accepted the invitation. In some embodiments, the first user may be charged a specific price to view the on-demand content. However, that price may be reduced relative to the number of other users that accept the invitation to join in viewing the on-demand content and is thus based on the total number of users that are to view the on-demand content. Similarly, the price charged to the other users for joining and viewing the content may be reduced relative to the total number of users viewing the on-demand content.

Process 400 proceeds next to block 408, where virtual-reality information is received for each user, i.e., the first user and the other users that accepted the shared on-demand invitation. In at least one embodiment, each content receiver associated with the users obtains or determines the virtual-reality information and provides it to the server, which is discussed in more detail below in conjunction with FIG. 5.

Briefly, the virtual-reality information for each user includes various different types of information associated with that particular user. For example, the virtual-reality information includes look information and movement information. The look information identifies, defines, or otherwise characterizes how the particular user would like to be viewed by the other users. For example, the look information may identify an avatar, character, celebrity impression, digital rendering of the second user, or other visual representation of the particular user. In various embodiments, each user selects how they would like other users to view them, which is then characterized as the look information.

The movement information identifies or defines how the particular user is moving in the real world while viewing the on-demand content. For example, the movement information may indicate when the user raises his or her right arm or if the user is attempting to walk. There are many different ways that a user's movements can be tracked, such as by tracking changes in camera images taken over time; gyroscopes, accelerometers, rotary sensors, or other sensors attached to the user's body; thermal sensors; or other movement detection systems.

The virtual-reality information also includes audio of the user speaking, singing, or otherwise vocalizing. In some embodiments, the audio associated with a particular user is received as a separate audio stream from the content receiver associated with that particular user.

Process 400 continues next at block 410, where a virtual rendering of each respective user is generated based on the virtual-reality information associated with that respective user. Generation of each virtual rendering includes generating a graphical representation of the respective user in a real-time manner based on the look and movement information received for the respective user. Accordingly, as a respective user physically moves, those movements are provided to the server as part of the virtual-reality information, which is then utilized to animate the virtual rendering of that respective user so that the virtual rendering mirrors or mimics the physical movements of the respective user.

Process 400 proceeds to decision block 412, where a determination is made whether a request to augment a user's virtual rendering is received. In some embodiments, the first user or the other users can input one or more augmentations to a look of another user. For example, a user can input that another user's virtual rendering is to include a blue necktie or a bowler hat. In at least one embodiment, these augmentations may be considered as "in app" purchases such that the requesting user would have to pay money to augment the virtual rendering of another user. In some embodiments, a user may input an augmentation request via a menu or preselected option prior to providing the on-demand content. In other embodiments, the virtual theater environment includes a virtual concession stand where a user can select which augmentations to add to which users throughout the presentation of the on-demand content.

In some embodiments, users may be provided with the opportunity to prevent their virtual rendering from being augmented. For example, the first user may make an "in app" purchase so that other users cannot modify the virtual rendering of the first user.

In various embodiments, decision block 412 may be optional and may not be performed. If an augmentation request is received, process 400 flows to block 414; otherwise, process 400 flows to block 416.

At block 414, a user's virtual rendering is augmented based on the received request. In various embodiments, this augmentation includes modifying the look information associated with that particular user. After block 414, process 400 proceeds to block 416.

If, at decision block 412, an augmentation request is not received, process 400 flows from decision block 412 to block 416. At block 416, the on-demand content and the virtual renderings of each user are provided to the content receivers of the users. In various embodiments, the on-demand content is provided to the content receivers of each user as an audiovisual content data stream and the virtual renderings as metadata or another data stream that is separate from the on-demand content. Moreover, any audio received from users is also provided to the content receivers of the users so that users can talk to one another.

Process 400 continues at decision block 418, where a determination is made whether the on-demand content has ended. If the on-demand content has not ended, then process 400 loops to block 408 to continue streaming the on-demand content to the users and to receive updated virtual-reality information for each user. In this way, each user's physical movements are captured and provided at block 408 in real time as the on-demand content is being provided to each user, which enables the content receivers to generate virtual theater environments in real time with the on-demand content and the virtual renderings of the users and their movements. If the on-demand content has ended, process 400 terminates or otherwise returns to a calling process to perform other actions.

Figure 5:
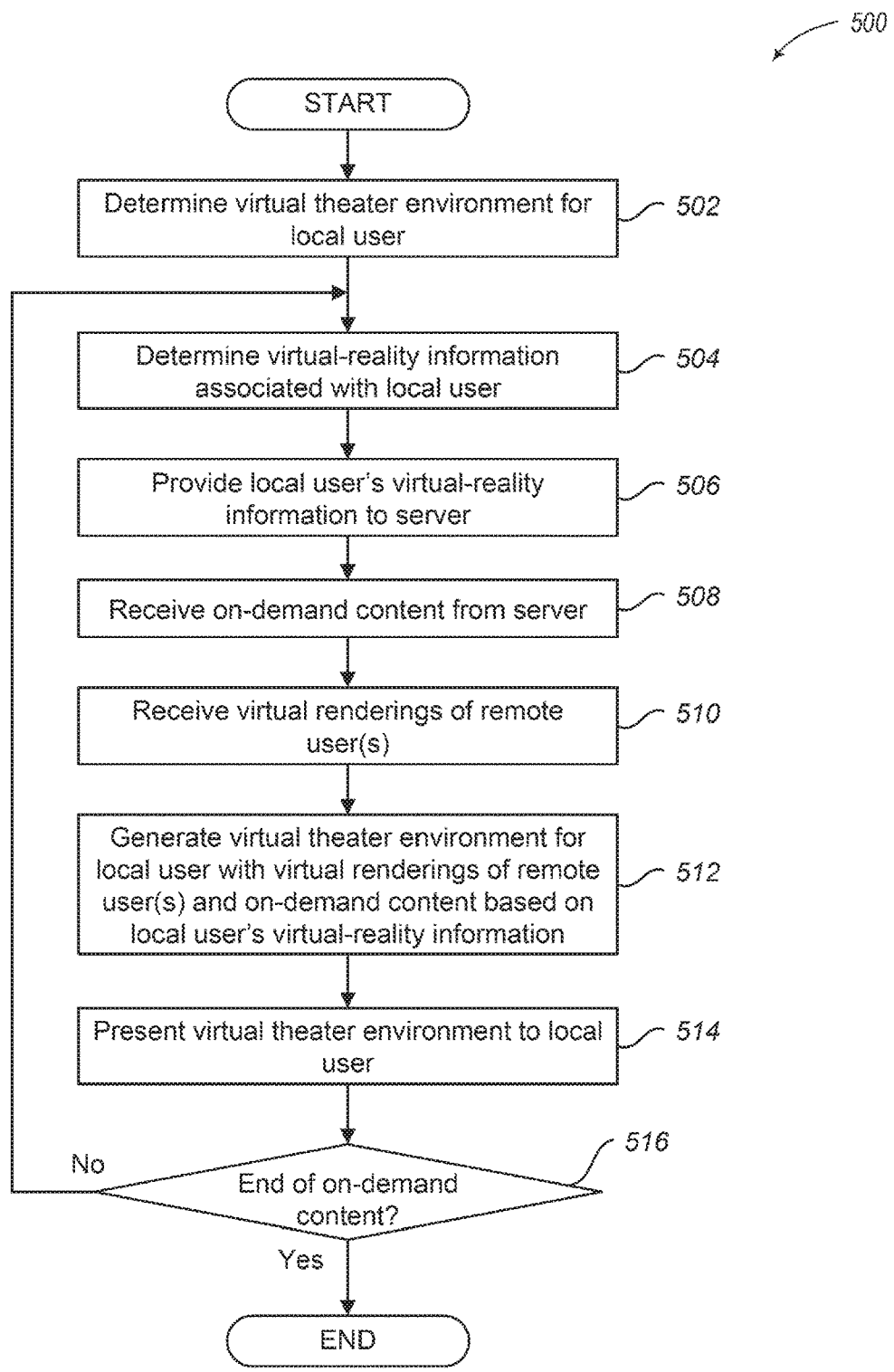
FIG. 5 illustrates a logical flow diagram generally showing one embodiment of a process performed by a content receiver to generate the virtual theater environment for presenting the shared on-demand content to a user in accordance with embodiments described herein.

FIG. 5 illustrates a logical flow diagram generally showing one embodiment of a process performed by a content receiver to generate the virtual theater environment for presenting the shared on-demand content to a user in accordance with embodiments described herein. Process 500 is performed by the content receiver of each user that is to view the shared on-demand content, such as the first user and the other users that accepted the shared on-demand content invitation described above in conjunction with FIG. 4. Accordingly, the user of the particular content receiver performing process 500 is referred to as the local user, and users of other content receivers are referred to as remote users.

Process 500 begins, after a start block, at block 502, where a virtual theater environment is determined for a local user. In some embodiments, the local user is presented with a list of various different theater-type environments from which to choose as the virtual theater environment. For example, the local user could choose a small 10-seat movie theater, a 1000-person Broadway theatre, or some other virtualized theater. In some embodiments, the first user in FIG. 4 that requests the shared on-demand content may also select the virtual theater environment so that each other user does not have to make such a selection.

Process 500 proceeds to block 504, where virtual-reality information associated with the local user is determined. As mentioned herein, the virtual-reality information includes look information and movement information associated with the local user, as well as audio received from the user.

The look information identifies, defines, or otherwise characterizes how the particular user would like to be viewed by the other user. In some embodiments, one or more of the cameras are utilized to capture an image of the local user's face, such as before the local user puts on the virtual-reality headset. From this image, a digital rendering of the local user is created, such as by using facial recognition techniques to identify facial characteristics that are used to create a virtual representation of the local user. In other embodiments, the local user selects some other virtual look, rather than the digital rendering of themselves, such as an avatar, character, celebrity impression, or other visual representation of the local user.

The movement information identifies or defines how the particular user is moving in the real world while viewing the on-demand content. In various embodiments, the movement information associated with the local user is determined based on multiple images captured over time by each of a plurality of cameras. The local user's body is identified in the images using image recognition techniques. Differences in the positioning of the user's body between images indicate movement of the local user. In other embodiments, other types of sensors may also be utilized, such as thermal sensors; gyroscopes, accelerometers, rotary sensors, or other sensors attached to the user's body; or other movement detection systems.

Process 500 continues at block 506, where the local user's virtual-reality information is provided to the server. In some embodiments, the content receiver provides the virtual-reality information, or changes thereof, periodically, at predetermined times or intervals, or when there are changes to the virtual-reality information. In this way, the user's movements are tracked in real time and provided to the server, where the server can update the virtual rendering of the local user, which is to be provided to the other content receiver.

Process 500 proceeds next to block 508, where on-demand content is received from the server. As mentioned above, the on-demand content may be received from the server via a streamed audiovisual file.

Process 500 continues next at block 510, where virtual renderings of the remote users are received. As mentioned above, the virtual renderings may be received from the server as metadata to the on-demand content or as a data stream. In some other embodiments, the content receiver may generate the virtual renderings of the remote users, rather than the server at block 410 in FIG. 4. In such an embodiment, the content receiver receives the virtual-reality information associated with the remote users and then generates the virtual renderings of the remote users based on the received virtual-reality information.

Process 500 proceeds to block 512, where the virtual theater environment is generated for the local user. The virtual theater is generated such that the virtual renderings of the remote users are positioned within the virtual theater and the on-demand content is displayed on a virtual screen in the virtual theater. In various embodiments, the virtual theater environment is generated from the perspective of the local user in accordance with the local user's movement information.

As illustrated above in conjunction with FIGS. 3B and 3C, the virtual theater environment consists of a front virtual screen, a plurality of seats, and a stage between the front screen and the seats. The local user's movements are not limited to just looking around the virtual theater. Rather, the local user can move between seats to see the virtual screen from a different perspective or angle. The local user can also walk among the seats, down alleys in the theater, and onto the stage. The local user can act out, perform, or conduct other movements via their virtual rendering standing on the stage or in some other area of the virtual theater environment. Since information associated with the user's movements is provided to the server and then provided to the remote users, the remote users can watch the virtual rendering of the local user move on the stage in front of the virtual screen, or elsewhere in the virtual theater. In this way, the local user and the remote users can interact with each other in more ways than just listening to each other or seeing an avatar of each user. Rather, the users can reenact the on-demand content that they are watching while the on-demand content is playing, as if they are actually in a real theater.

As the local user moves around the virtual theater based on the local user's movement information determined at block 504, the look of the virtual theater also moves and adjusts with the user. In some embodiments, when the local user is "on the stage" and can look up at the seats, the virtual theater environment includes a second virtual screen on the back wall behind the seats on which the on-demand content is shown, similar to what is shown in FIG. 3B. In this way, the local user does not have to miss any of the on-demand content while one stage.

Process 500 then proceeds to block 514, where the virtual theater environment is presented to the local user. In some embodiments, where the content receiver is part of a virtual-reality headset, the virtual-reality headset displays the virtual theater environment to the first user. In other embodiments, where the content receiver is separate from the virtual-reality headset, the content receiver transmits the virtual theater environment, such as in a wireless video stream, to the virtual-reality headset for display to the first user.

Process 500 continues at decision block 516, where a determination is made whether the on-demand content has ended. In various embodiments, this determination is based on an end-of-file message received by the content receiver. In other embodiments, the end of the on-demand content may be identified based on a manual command provided by the first user, such as by activating a stop or pause button or changing the television channel away from the on-demand content. If the on-demand content has ended, process 500 terminates or otherwise returns to a calling process to perform other actions. If the on-demand content has not ended, process 500 loops to block 504 to continue to determine virtual-reality information of the local user, such as the movement information; receive the on-demand content; receive the virtual renderings and their movements of remote users; and generate the virtual theater environment for presentation to the local user.

Figure 6:
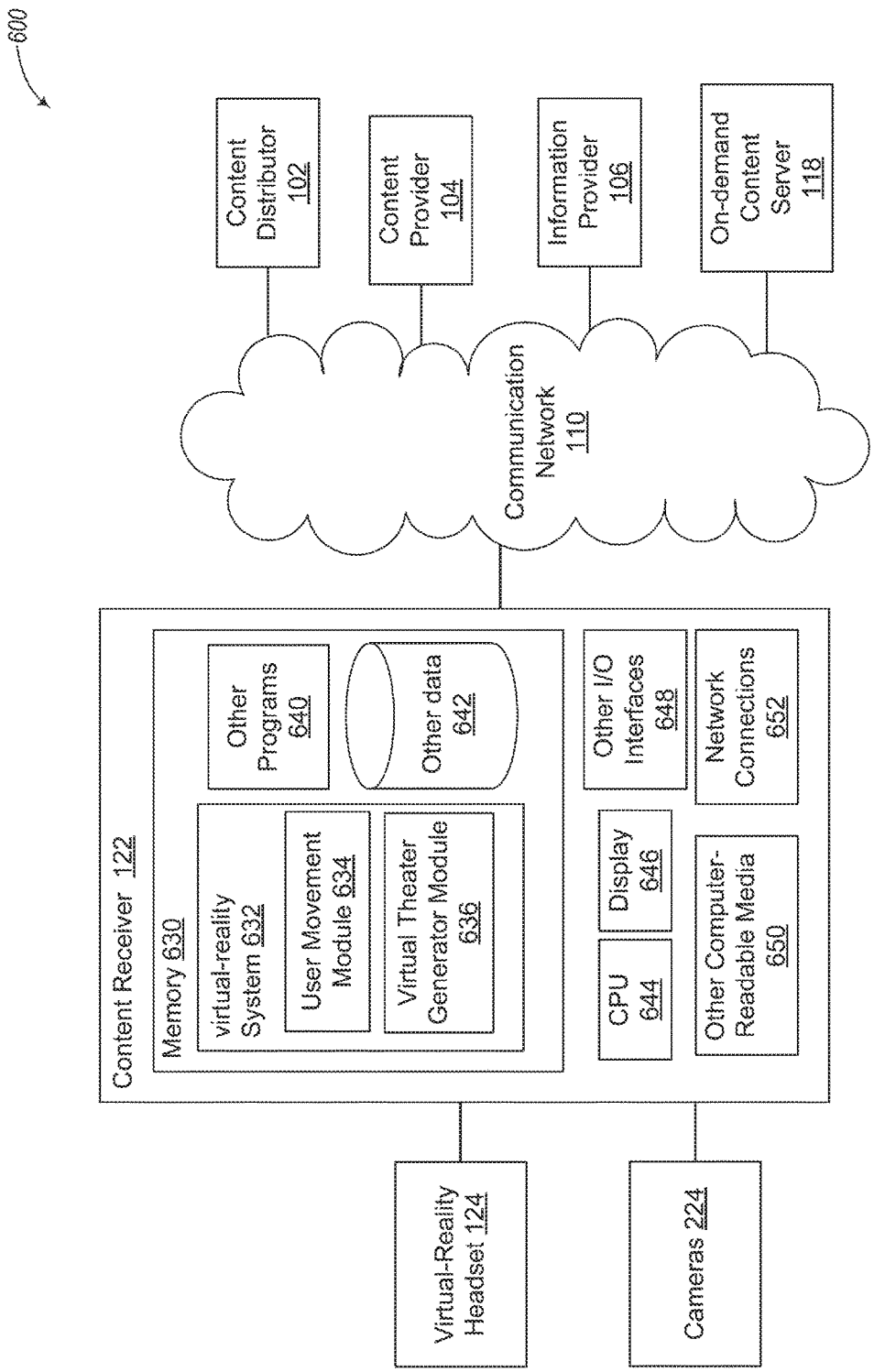
FIG. 6 shows a system diagram that describes one implementation of computing systems for implementing embodiments described herein.

FIG. 6 shows a system diagram that describes one implementation of computing systems for implementing embodiments described herein. System 600 includes content receiver 122, content distributor 102, content provider 104, information provider 106, and on-demand content server 118. System 600 also includes virtual-reality headset 124 and cameras 224.

Content receiver 122 receives content and virtual-reality information for other users from content distributor 102 or on-demand content server 118 and generates a virtual theater environment for presentation to a user via virtual-reality headset 124, as described herein. In various embodiments, the content receiver 122 analyzes image data received from cameras 224 to generate virtual-reality information for the local user of the content receiver 122 and provides it to the content distributor 102 or the on-demand content server 118 for providing to the other users, as described herein.

One or more general-purpose or special-purpose computing systems may be used to implement content receiver 122. Accordingly, various embodiments described herein may be implemented in software, hardware, firmware, or in some combination thereof. As mentioned above, the content receiver 122 and the virtual-reality headset 124 may be separate devices or they may be incorporated into a single device. Similarly, the content distributor 102 and the on-demand content server 118 may be separate devices or they may be incorporated into a single device.

Content receiver 122 may include memory 630, one or more central processing units (CPUs) 644, display interface 646, other I/O interfaces 648, other computer-readable media 650, and network connections 652.

Memory 630 may include one or more various types of non-volatile and/or volatile storage technologies. Examples of memory 630 may include, but are not limited to, flash memory, hard disk drives, optical drives, solid-state drives, various types of random access memory (RAM), various types of read-only memory (ROM), other computer-readable storage media (also referred to as processor-readable storage media), or the like, or any combination thereof. Memory 630 may be utilized to store information, including computer-readable instructions that are utilized by CPU 644 to perform actions, including embodiments described herein.

Memory 630 may have stored thereon virtual-reality system 632, which includes user movement module 634 and virtual theater generator module 636. The user movement module 634 may employ embodiments described herein to utilize image data captured by cameras 224 to determine and track body movement of the user of the virtual-reality headset 124. Virtual theater generator 636 employs embodiments described herein to utilize on-demand content and virtual renderings of other users, or virtual-reality information of other users, to generate the virtual theater environment for presentation on the virtual-reality headset 124 to the user of the system 600

Memory 630 may also store other programs 640 and other data 642. For example, other data 642 may include predetermined virtual renderings of one or more users or other information.

Display interface 646 is configured to provide content to a display device, such as virtual-reality headset 124. Network connections 652 are configured to communicate with other computing devices, such as content distributor 102 or on-demand content server 118, via communication network 110. Other I/O interfaces 648 may include a keyboard, audio interfaces, other video interfaces, or the like. Other computer-readable media 650 may include other types of stationary or removable computer-readable media, such as removable flash drives, external hard drives, or the like.

The virtual-reality headset 124 includes a display device for presenting the virtual theater environment to the user. In various embodiments, the virtual-reality headset 124 includes other computing components similar to content receiver 122 (e.g., a memory, processor, I/O interfaces, etc.), but are not illustrated here for convenience. Moreover, in some embodiments, the virtual-reality headset 124 includes the components and functionality of the content receiver 122.

Content distributor 102, content provider 104, information provider 106, on-demand content server 118, and content receiver 122 may communicate via communication network 110. The content distributor 102, content provider 104, information provider 106, and on-demand content server 118 include processors, memory, network connections, and other computing components that enable the server computer devices to perform actions as described herein, but are not illustrated here for convenience.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
 a first content receiver that includes a first memory for storing first instructions and a first processor that executes the first instructions to perform actions, the actions including:
  providing, to a content-distribution server, a request for shared on-demand content between a first user of the first content receiver and a second user of a second content receiver;
  determining a virtual theater environment in which to display the on-demand content to the first user;
  receiving the on-demand content from the content-distribution server;
  during the receiving of the on-demand content:

determining first movement information associated with the first user;
providing first virtual-reality information to the content-distribution server, wherein the first virtual-reality information includes the first movement information of the first user and information associated with a look of the first user;
receiving second virtual-reality information associated with the second user, wherein the second virtual-reality information includes information associated with a look of the second user and second movement information of the second user;
generating a virtual rendering of the second user based on the first second virtual-reality information;
generating the virtual theater environment with the virtual rendering of the second user and the on-demand content based on the first movement information of the first user and the second movement information of the second user;
providing the virtual theater environment to the first user;
receiving a request from the first user to augment the virtual rendering of the second user during the providing of the virtual theater environment to the first user:
modifying the virtual rendering of the second user based on the received request; and
updating the virtual theater environment to include the modified virtual rendering of the second user; and
the content-distribution server includes a second memory for storing second instructions and a second processor that executes the second instructions to perform other actions, the other actions including:
receiving the request for the on-demand content;
providing an invitation to the second content receiver of the second user to join the first user in the virtual theater environment and receive the on-demand content;
receiving an acceptance to the invitation from the second user;
providing the on-demand content to the first content receiver of the first user and to the second content receiver of the second user; and
during the providing of the on-demand content:
receiving the first virtual-reality information from the first content receiver of the first user and providing the first virtual-reality information to the second content receiver of the second user; and
receiving the second virtual-reality information from the second content receiver of the second user and providing the second virtual-reality information to the first content receiver of the first user.

2. The system of claim 1, wherein generating the virtual theater environment includes displaying the on-demand content on a virtual screen in front of a plurality of virtual seats as if the first user is sitting in one of the plurality of virtual seats and positioning the virtual rendering of the second user on a virtual stage that is between the plurality of virtual seats and the virtual screen.

3. The system of claim 2, wherein generating the virtual theater environment includes modifying movement and positioning of the virtual rendering of the second user on the virtual stage based on the second movement information of the second user received from the content-distribution server.

4. The system of claim 1, wherein generating the virtual theater environment includes displaying a plurality of virtual seats in front of a virtual stage as if the first user is standing on the virtual stage with a virtual screen showing the on-demand content behind the first user and positioning the virtual rendering of the second user in one of the plurality of virtual seats.

5. The system of claim 4, wherein generating the virtual theater environment includes displaying the on-demand content on a second virtual screen that is behind the plurality of virtual seats.

6. The system of claim 1, wherein determining the first movement information associated with the first user includes:
receiving images of the first user from each of a plurality of cameras;
determining a positioning of the first user based on the images; and
determining the first movement information of the first user based on changes in the positioning of the first user over time.

7. The system of claim 1, further comprising:
wherein the first processor of the first content receiver executes the first instructions to perform further actions, the further actions including:
providing the request to the content-distribution server; and
wherein the second processor of the content-distribution server executes the second instructions to perform further actions, the further actions including:
receiving the request to augment the virtual rendering of the second user from the first content receiver;
modifying the second virtual-reality information associated with the second user based on the received request; and
providing the modified second virtual-reality information to a third content receiver of a third user to be used in generating a modified virtual rendering of the second user and providing a second virtual theater environment with the modified virtual rendering of the second user and the on-demand content to the third user.

8. A computing device, comprising:
a memory that stores instructions; and
a processor that executes the instructions to:
receive a request for on-demand content from a first content receiver of a first user to present in a virtual theater environment;
provide an invitation to a second content receiver of a second user and to a third content receiver of a third user to join the first user in the virtual theater environment to receive the on-demand content;
receive an acceptance to the invitation from the second and third content receivers;
provide the on-demand content to the first content receiver and to the second content receiver and to the third content receiver; and
during the providing of the on-demand content:
receive, from the first content receiver of the first user, first virtual-reality information associated with a look of the first user and movement information of the first user;
generate a first virtual rendering of the first user based on the look and movement information of the first user;
provide the first virtual rendering of the first user to the second and third content receivers to enable the second and third content receivers to generate the virtual theater environment with the first virtual rendering of the first user and the on-demand content from a perspective of the second and third users, respectively, in the virtual theater environment;

receive, from the second content receiver of the second user, second virtual-reality information associated with a look of the second user and movement information of the second user;

generate a second virtual rendering of the second user based on the look and movement information of the second user; and provide the second virtual rendering of the second user to the first and third content receivers to enable the first and third content receivers to generate the virtual theater environment with the second virtual rendering of the second user and the on-demand content from a perspective of the first and third users, respectively, in the virtual theater environment;

receive, from the first content receiver, a request to alter the second virtual rendering of the second user;

modifying the second virtual rendering of the second user based on the received request; and provide the modified second virtual rendering of the second user to the first and third content receivers to enable the first and third content receivers to generate the virtual theater environment with the modified second virtual rendering of the second user.

9. The computing device of claim 8, wherein the virtual theater environment generated by the first content receiver is from a perspective of the first user such that the on-demand content is displayed on a virtual screen in front of a plurality of virtual seats as if the first user is sitting in one of the plurality of virtual seats and positioning the second virtual rendering of the second user on a virtual stage that is between the plurality of virtual seats and the virtual screen.

10. The computing device of claim 9, wherein movement and positioning of the second virtual rendering of the second user on the virtual stage based on the second virtual-reality information associated with the second user.

11. The computing device of claim 8, wherein the virtual theater environment generated by the second content receiver is from a perspective of the second user such that a plurality of virtual seats are displayed in front of a virtual stage as if the second user is standing on the virtual stage with a virtual screen showing the on-demand content behind the second user and positioning the virtual rendering of the first user in one of the plurality of virtual seats.

12. The computing device of claim 11, wherein the virtual theater environment generated by the second content receiver includes the on-demand content displayed on a second virtual screen that is behind the plurality of virtual seats.

13. The computing device of claim 8, wherein the first virtual-reality information includes a positioning and movement of the first user's body based on images of the first user captured over time by at least one camera.

14. A method, comprising:
receiving a request to present on-demand content in a virtual theater environment for each of a plurality of users;
providing the on-demand content to a respective content receiver of each of the plurality of users;
determining respective movement information of each of the plurality of users;
generating a respective virtual rendering of each of the plurality of users based on the respective movement information;
exchanging the virtual renderings of each of the plurality of users between the content receivers of each of the plurality of users;
generating a respective version of the virtual theater environment with the on-demand content for each of the plurality of users from each respective user's prospective based on the virtual renderings of each of the plurality users;
presenting each respective version to the respective user, during the presenting of each respective version to the respective user:
receiving, from a first user of the plurality of users, a request to modify the respective virtual rendering of a second user of the plurality of users;
modifying the respective virtual rendering of the second user based on the request; and
modifying each respective version of the virtual theater environment with the on-demand content for each of the plurality of users from each respective user's prospective based on the modified virtual rendering of the second user.

15. The method of claim 14, wherein generating the respective version of the virtual theater environment includes displaying the on-demand content on a virtual screen in front of a plurality of virtual seats as if the respective user is sitting in one of the plurality of virtual seats and positioning the virtual rendering of other users on a virtual stage that is between the plurality of virtual seats and the virtual screen.

16. The method of claim 15, wherein generating the respective version of the virtual theater environment includes modifying movement and positioning of the virtual renderings of the other users on the virtual stage based on the respective movement information of the other users.

17. The method of claim 14, wherein generating the respective version of the virtual theater environment includes displaying a plurality of virtual seats in front of a virtual stage as if the respective user is standing on the virtual stage with a virtual screen showing the on-demand content behind the respective user and positioning the virtual renderings of other users in the plurality of virtual seats or on the virtual stage.

18. The method of claim 17, wherein generating the respective version of the virtual theater environment includes displaying the on-demand content on a second virtual screen that is behind the plurality of virtual seats.

* * * * *